United States Patent
Otomaru et al.

(10) Patent No.: US 10,297,035 B2
(45) Date of Patent: May 21, 2019

(54) IMAGE PROCESSING APPARATUS, IMAGE PROCESSING METHOD, AND PROGRAM

(71) Applicant: CANON KABUSHIKI KAISHA, Tokyo (JP)

(72) Inventors: Itaru Otomaru, Kawasaki (JP); Kazuhiro Miyasa, Narashino (JP); Kiyohide Satoh, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 26 days.

(21) Appl. No.: 15/481,358

(22) Filed: Apr. 6, 2017

(65) Prior Publication Data
US 2017/0301099 A1  Oct. 19, 2017

(30) Foreign Application Priority Data
Apr. 13, 2016  (JP) ................................ 2016-080497

(51) Int. Cl.
| | | |
|---|---|---|
| *G06T 7/00* | (2017.01) | |
| *G06T 7/33* | (2017.01) | |
| *G06T 7/246* | (2017.01) | |

(52) U.S. Cl.
CPC .............. *G06T 7/344* (2017.01); *G06T 7/251* (2017.01); *G06T 2200/04* (2013.01); *G06T 2207/10072* (2013.01); *G06T 2207/30068* (2013.01)

(58) Field of Classification Search
CPC .............. G06K 9/00; G06T 7/00; H04N 1/00
USPC .................................. 382/128–134; 606/226
See application file for complete search history.

(56) References Cited

U.S. PATENT DOCUMENTS

| | | | | |
|---|---|---|---|---|
| 8,908,944 B2* | 12/2014 | Ishikawa | ............... | G06T 7/0032 382/128 |
| 9,952,526 B2* | 4/2018 | Omura | ............... | G03G 15/0131 |

FOREIGN PATENT DOCUMENTS

JP  2014-108349 A  6/2014

OTHER PUBLICATIONS

D. Rueckert, et al., "Nonrigid Registration Using Free-form Deformations: Application to Breast MR Images" IEEE med. imag., vol. 18(8), pp. 712-721, 1999.

(Continued)

*Primary Examiner* — Abolfazl Tabatabai
(74) *Attorney, Agent, or Firm* — Canon U.S.A., Inc. IP Division

(57) ABSTRACT

An image processing apparatus according to an aspect of the disclosure includes a first deformation acquisition unit configured to perform registration of a first image and a second image and acquire a first deformation parameter that expresses a deformation between the first image and the second image by using a first deformation model, a generation unit configured to generate intermediate data that indicates a deformation expressed by the first deformation model and the first deformation parameter, and a second deformation acquisition unit configured to acquire, based on the intermediate data, a second deformation parameter that expresses a deformation, which is indicated by the intermediate data, by using a second deformation model.

20 Claims, 5 Drawing Sheets

(56) References Cited

OTHER PUBLICATIONS

Hans J. Johnson, et al., "Landmark and Intensity-based, Consistent Thin-plate Spline Image Registration" Proc. 17th Int. Conf. on Information Processing in Medical Imaging (IPMI 2001), pp. 329-343, 2001, Dept. of Electrical and Computer Engineering, University of Iowa, Iowa City, IA.

M. Staring, et al., "A Rigidity Penalty Term for Nonrigid Registration" Med. Phys., vol. 34 (11), pp. 4098-4108, 2007, Utrecht, The Netherlands.

* cited by examiner

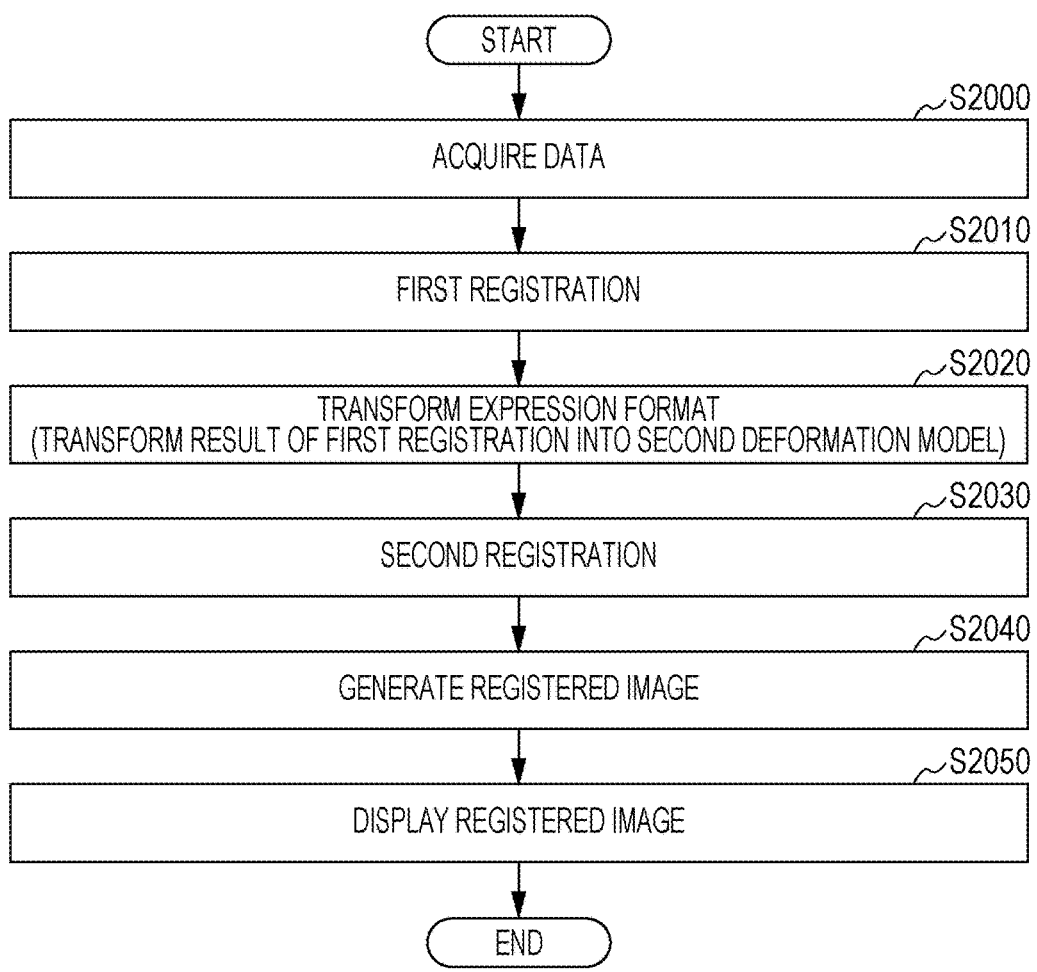

IMAGE PROCESSING APPARATUS, IMAGE PROCESSING METHOD, AND PROGRAM

BACKGROUND OF THE INVENTION

Field of the Invention

The present disclosure relates to an image processing apparatus, an image processing method, and a program that perform registration between images.

Description of the Related Art

In a medical field, when a doctor makes diagnosis by comparing a plurality of images, it is important to deform images captured by different image capturing apparatuses (modalities), on different dates and times, or in different postures (such as a prone position and a supine position) and perform registration between the images. A method of combining a plurality of image deformation models in multiples stages in order to improve accuracy of the registration while suppressing an increase in a processing time has been known.

Japanese Patent Laid-Open No. 2014-108349 discloses a method of connecting a rigid deformation and two non-rigid deformations in multiple stages and, with a registration result in a foregoing stage as an initial state, performing registration in a following stage. Further, in "Nonrigid registration using free-form deformations: application to breast MR images" by D. Rueckert, L. Sonoda, C. Hayes, D. Hill, M. Leach, and D. Hawkes, IEEE med. imag., vol. 18(8), pp. 712-721, 1999 (Non Patent Literature 1), disclosed is a method of, in deformation estimation using a free-form deformation (FFD) with a plurality of resolutions, performing registration by expressing a deformation, which is obtained through a coarse FFD in a foregoing stage, to be taken over with a fine FFD in a following stage. In addition, in "Landmark and intensity-based, consistent thin-plate spline image registration" by Hans J. Johnson and Gary E. Christensen, Proc. 17th Int. Conf. on Information Processing in Medical Imaging (IPMI 2001), pp. 329-343, 2001 (Non Patent Literature 2), disclosed is a method of expressing a deformation, which is obtained by Thin plate spline (TPS), again in a rough displacement field and then performing nonlinear optimization processing by using the displacement field itself as a deformation model.

The method of Japanese Patent Laid-Open No. 2014-108349 has a problem that even when an inappropriate deformation state is caused by the registration in the foregoing stage, the deformation in the foregoing stage is difficult to be corrected by the registration in the following stage. The method described in each of Non Patent Literatures 1 and 2 described above has a problem that the deformation in the foregoing stage is able to be corrected in the following stage, but a combination of deformation models is limited.

SUMMARY OF THE INVENTION

An image processing apparatus according to an aspect of the disclosure includes: a first deformation acquisition unit configured to perform registration of a first image and a second image and acquire a first deformation parameter that expresses a deformation between the first image and the second image by using a first deformation model; a generation unit configured to generate intermediate data that indicates a deformation expressed by the first deformation model and the first deformation parameter; and a second deformation acquisition unit configured to acquire, based on the intermediate data, a second deformation parameter that expresses a deformation, which is indicated by the intermediate data, by using a second deformation model.

Further features of the disclosure will become apparent from the following description of exemplary embodiments with reference to the attached drawings.

BRIEF DESCRIPTION OF THE DRAWINGS

FIG. 2 is a flowchart illustrating processing procedure performed by the image processing apparatus according to the first embodiment.

DESCRIPTION OF THE EMBODIMENTS

The aspect of the disclosure provides, for example, an image processing apparatus capable of, when performing registration between images by using a combined plurality of deformation models, performing the registration while utilizing advantages of the deformation models.

Embodiments of the disclosure will hereinafter be described in detail with reference to drawings. However, components described in the embodiments are merely examples, and the technical scope of the disclosure is determined by the scope of the claims and is not limited by the following individual embodiments.

First Embodiment

Figure 1:
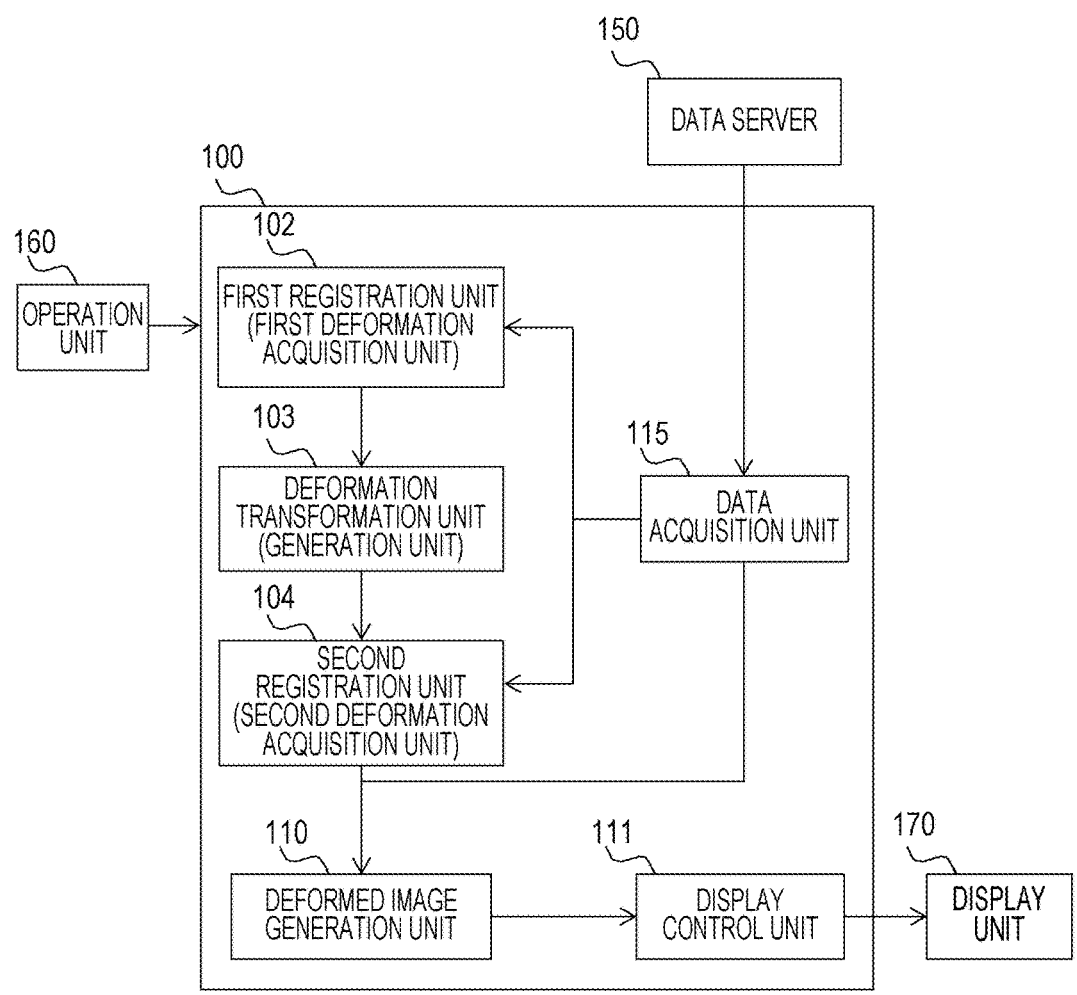
FIG. 1 illustrates an example of an image processing system including an image processing apparatus according to a first embodiment.

FIG. 1 illustrates an example of an image processing system including an image processing apparatus according to the present embodiment. The image processing system includes an image processing apparatus 100, a data server 150, an operation unit 160, and a display unit 170. The image processing apparatus 100 includes a first registration unit (first deformation acquisition unit) 102, a deformation transformation unit (generation unit) 103, a second registration unit (second deformation acquisition unit) 104, a deformed image generation unit 110, a display control unit 111, and a data acquisition unit 115.

The image processing apparatus 100 according to the present embodiment performs registration between two images of a first image and a second image by using two types (a plurality of types) of deformation models of a first deformation model and a second deformation model. Then, a registered image (deformed image) in which one of the images is deformed in accordance with the other image is generated.

The first registration unit (first deformation acquisition unit) 102 performs registration of the first image and the second image, and thereby acquires a first deformation parameter that expresses a deformation between the first image and the second image by using the first deformation model (first registration processing).

The deformation transformation unit (generation unit) 103 transforms first deformation expression formed by the first deformation model and the first deformation parameter into second deformation expression formed by the second deformation model and a second deformation parameter (processing of transforming an expression format). Thus, first, the deformation transformation unit 103 generates intermediate data expressing a deformation on the basis of the first deformation expression. In the present exemplary embodiment, a displacement of a plurality of sampling points on the first image is calculated as the intermediate data expressing the deformation (foregoing stage processing of transforming an expression format).

Then, the deformation transformation unit 103 acquires a parameter of the second deformation model (second deformation parameter), which expresses the deformation between the first image and the second image, on the basis of the calculated intermediate data (the displacement of the sampling points) (following stage processing of transforming an expression format). The processing is performed for transforming the first deformation expression by the first deformation model into the second deformation expression by the second deformation model through the intermediate data, and corresponds to processing of expressing the deformation, which is expressed by the first deformation model, again with the second deformation model.

The second registration unit 104 performs registration of the first image and the second image with use of the second deformation model by using the second deformation parameter, which is generated by the deformation transformation unit 103, as an initial value and updates the second deformation parameter (second registration processing). On the basis of the updated second deformation parameter, the deformed image generation unit 110 generates a registered image obtained by deforming at least any one of the first image and the second image in accordance with the other image.

In the second registration processing, a normalized term is introduced to suppress an inappropriate deformation (for example, a deformation locally causing a great volume change) of an image. The second registration unit (second deformation acquisition unit) 104 uses an evaluation function, in which the normalized term for suppressing the deformation of the first image is introduced, to acquire the second deformation parameter that expresses, with the second deformation model, the deformation between the first image and the second image. As a result, even when the first registration processing causes an inappropriate deformation state in a first deformed image, the inappropriate deformation state is able to be corrected by the second registration processing.

In the present embodiment, the first deformation model and the second deformation model are different deformation models. In Non Patent Literatures 1 and 2, when at least any of the first deformation model and the second deformation model is a specific deformation model, a plurality of deformation models are able to be applied. On the other hand, in the present embodiment, deformation expression (first deformation expression) of the first deformation model is transformed into deformation expression (second deformation expression) of the second deformation model through deformation expression (intermediate data) that does not depend on a deformation model. Thus, a plurality of deformation models are able to be applied no matter what combination of deformation models the first deformation model and the second deformation model have.

In the present embodiment, by performing registration of the first image and the second image by using the first deformation model, the first deformation parameter between the first image and the second image is acquired. Then, as intermediate data expressing a deformation, a displacement of a plurality of sample positions set on the first image is calculated on the basis of the first deformation expression formed by the first deformation model and the first deformation parameter. By acquiring the second deformation parameter expressing the deformation between the first image and the second image by using the second deformation model on the basis of the calculated intermediate data, the first deformation expression is transformed into the second deformation expression formed by the second deformation model and the second deformation parameter.

Further, by performing the registration of the first image and the second image with use of the second deformation model by using the transformed second deformation parameter as an initial value, the second deformation parameter is updated. Thereby, the registration of the first image and the second image is executed by using a plurality of deformation models.

As an example of the first image and the second image, considered is a case of performing registration of two three-dimensional tomographic images obtained by capturing images of a breast (for example, right breast) of the same subject under different image capturing conditions (different modalities, image capturing modes, dates and times, postures, or the like). At this time, even though a deformation is generated in the breast because of different image capturing conditions, there is almost no change in a volume of a breast region between the first image and the second image. As an image capturing apparatus (modality) capturing a three-dimensional tomographic image, there is an MRI apparatus, a radiation CT apparatus, a three-dimensional ultrasonic image capturing apparatus, a photoacoustic tomography apparatus, a Positron Emission Tomography (PET)/Single Photon Emission Computed Tomography (SPECT), an OCT apparatus, or the like.

In the present embodiment, a case where the first deformation model is TPS (Thin plate spline) and the second deformation model is FFD (Free form deformation) is considered.

In the first registration processing of the present embodiment, a value of the first deformation parameter of the first deformation model is calculated so that a positional deviation of a corresponding point group (for example, a reference point group) between the first image and the second image is minimized.

In the second registration processing of the present embodiment, a cost function in which a data term related to matching of the corresponding point group (for example, the reference point group) between the first image and the second image and a normalized term related to Jacobian of a displacement field are introduced is used. The second deformation parameter of the second deformation model by which the cost function is minimized is acquired.

The Jacobian is an index indicating a volume change in a local region. By adding the Jacobian as normalized cost, an inappropriate volume change caused in the first registration processing is able to be suppressed by the second registration processing.

As illustrated in FIG. 1, the image processing apparatus 100 is electrically connected to the data server 150, the operation unit 160, and the display unit 170. The data server 150 retains the first image and the second image to be subjected to registration processing. The first image and the second image are input to the image processing apparatus 100 via the data acquisition unit 115 in response to a request from the image processing apparatus 100.

The operation unit 160 performs an operation for a mouse, a keyboard, and a GUI on the display unit 170, and inputs, to the image processing apparatus 100, an instruction to start, check, and end registration processing or an instruction of display control to decide a cross section of a display image. The display unit 170 displays a display image generated by the image processing apparatus 100. The display unit 170 may display a GUI for inputting an instruction from a user.

The data acquisition unit 115 acquires, from the data server 150, information of the first image and the second image, which is input to the image processing apparatus 100. The first registration unit (first deformation acquisition unit) 102 performs the first registration processing by using the first deformation model and acquires a value of the first deformation parameter.

The deformation transformation unit (generation unit) 103 transforms the first deformation expression by the first deformation model into the second deformation expression by the second deformation model through versatile deformation expression (intermediate data) that does not depend on a deformation model. The second registration unit 104 performs the second registration processing with use of the second deformation model by using the second deformation parameter, which is transformed by the deformation transformation unit 103, as an initial value and updates the second deformation parameter.

The deformed image generation unit 110 generates a registered image (deformed image) obtained by deforming at least any one of the first image and the second image so as to match a shape of the other image in accordance with a result of the second registration processing. The display control unit 111 performs display control for displaying, on the display unit 170, the registered image (deformed image) output from the deformed image generation unit 110.

Next, an operation of the image processing system including the image processing apparatus according to the present embodiment will be described. FIG. 2 is a flowchart illustrating processing procedure performed by the image processing apparatus 100.

(Data Acquisition Processing: Step S2000)

At step S2000, the data acquisition unit 115 receives an instruction from the user and acquires the first image and the second image from the data server 150. The data acquisition unit 115 then outputs the first image and the second image to the first registration unit (first deformation acquisition unit) 102 and the second registration unit (second deformation acquisition unit) 104.

(First Registration Processing: Step S2010)

At step S2010, the first registration unit (first deformation acquisition unit) 102 performs the first registration (deformation estimation) between the first image and the second image by using the first deformation model, and thereby acquires deformation expression (first deformation expression) by the first deformation model. That is, the first registration unit (first deformation acquisition unit) 102 calculates a value of the first deformation parameter so that the first image is most approximate to the second image when the first image is deformed by using the first deformation model. The first registration unit (first deformation acquisition unit) 102 outputs the calculated first deformation parameter to the deformation transformation unit 103.

The first registration unit (first deformation acquisition unit) 102 may acquire the first deformation parameter by performing registration between a corresponding point group (first reference point group) of the first image and a corresponding point group (second reference point group) of the second image by using the first deformation model. Since the first deformation model in the present embodiment is the TPS as described above, a well-known registration method of obtaining a parameter of the TPS expressing a deformation between images (the first image and the second image) is able to be applied.

For example, by acquiring the corresponding point groups (reference point groups) which are associated in the first image and the second image and obtaining a deformation so that coordinates are matched between the corresponding point groups, the first registration processing is performed. In the first registration processing of the present embodiment, TPS functions may be set as bases at positions of the corresponding point group on the first image so as to form a deformation model expressing coordinate transformation by a weighted sum of the bases.

At this time, a coordinate transformation equation, which indicates a condition that coordinates of the corresponding point group (first reference point group) of the first image are transformed so as to match coordinates of the corresponding point group (second reference point group) of the second image, and each of the corresponding point groups (reference point groups) are simultaneously solved as a simultaneous equation. This makes it possible to obtain the first deformation parameter.

Note that, a well-known image analysis method is able to be applied to acquire a corresponding point group (reference point group). For example, the first registration unit (first deformation acquisition unit) 102 applies image analysis processing to the first image and the second image and extracts anatomical feature points such as a blood vessel branched part. Then, by associating the anatomical feature points between the first image and the second image on the basis of similarity, the first registration unit (first deformation acquisition unit) 102 is able to associate the corresponding point group (first reference point group) of the first image with the corresponding point group (second reference point group) of the second image.

Note that, the corresponding point group (first reference point group) of the first image and the corresponding point group (second reference point group) of the second image may be associated with each other when the user inputs the corresponding point groups by visually observing images. Further, in a case where information of the corresponding point groups (reference point groups) is saved in advance in the data server 150 as supplementary information of images, the corresponding point group (first reference point group) of the first image and the corresponding point group (second reference point group) of the second image may be associated with each other when the information is read from the data server 150.

(Processing of Transforming Expression Format: Step S2020)

At step S2020, the deformation transformation unit (generation unit) 103 transforms the first deformation expression calculated at step S2010 into the deformation expression (second deformation expression) by the second deformation model. That is, the second deformation parameter that expresses a deformation equivalent to the first deformation expression with the second deformation model is calculated. Thereby, a result of the first registration, which is expressed by the first deformation model, is expressed again by the second deformation model. Then, the calculated second deformation parameter is output to the second registration unit (second deformation acquisition unit) 104 as a result of the processing of transforming the expression format.

The processing of transforming the expression format is performed through deformation expression (intermediate data) that does not depend on a deformation model. Specifically, the processing of transforming the expression format in the present embodiment includes foregoing stage processing of transforming the first deformation expression into the deformation expression (intermediate data) that does not depend on a deformation model and following stage processing of transforming the deformation expression (intermediate data) that does not depend on a deformation model into the second deformation expression.

In the foregoing stage processing, the deformation transformation unit (generation unit) 103 sets a plurality of sample positions (for example, sampling points) on the first image. For example, the sample positions are able to be set with regular intervals on lattice points of the first image. Next, the deformation transformation unit 103 calculates a displacement vector of each of the sample positions (sampling points) by using the first deformation expression (the first deformation model and the first deformation parameter). Thereby, the first deformation expression is transformed into versatile deformation expression (intermediate data) that does not depend on a deformation model as a displacement of the plurality of sample positions. Such processing is equivalent to processing of obtaining, on the basis of the first deformation expression, a virtual corresponding point group (for example, sample positions such as sampling points) between the first image and a deformed image (first deformed image) which is to be obtained when the first image is deformed by the first deformation expression.

Figure 3A:
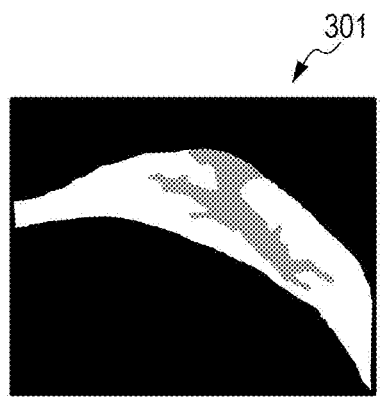
FIGS. 3A to 3D are schematic views for explaining processing of transforming an expression format.
Figure 3B:
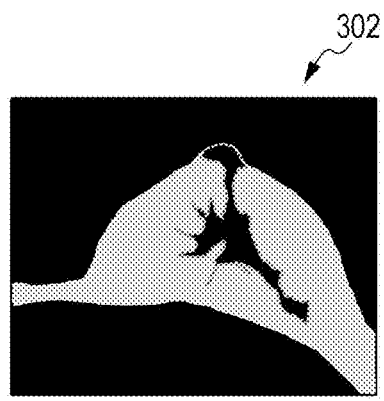
Figure 3C:
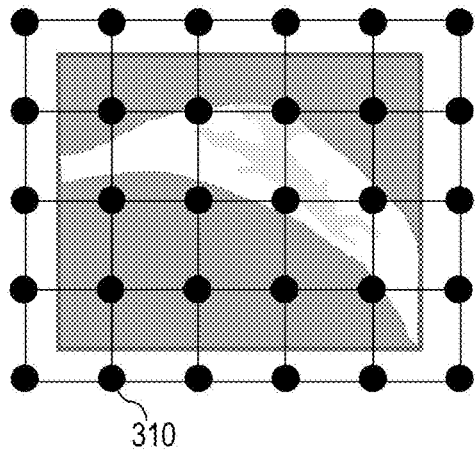
Figure 3D:
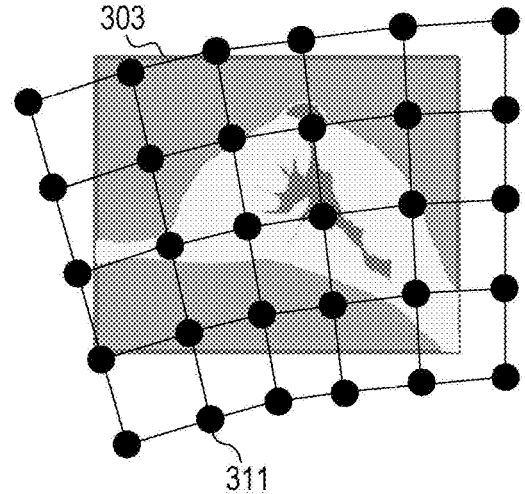

FIGS. 3A to 3D are views for explaining the processing of transforming the expression format. Though a processing target in the present embodiment is a three-dimensional image as described above, description will be given here by using a two-dimensional image to facilitate illustration. FIGS. 3A and 3B illustrate a first image 301 and a second image 302 that are captured from a breast of the same subject under different image capturing conditions. FIG. 3C illustrates the first image 301 in which sample positions (sampling point group) 310 are set. FIG. 3D illustrates a deformed image (first deformed image) 303 that is to be obtained when the first image 301 is deformed by using the first deformation expression.

In the present embodiment, the deformation transformation unit (generation unit) 103 calculates a displacement vector of each of the sample positions 310 on the first image 301 by using the first deformation expression as a result of the first registration processing. That is, coordinates of sample positions 311, which correspond to the sample positions 310, on the first deformed image 303 are obtained.

Specific processing is as follows. First, as illustrated in FIG. 3C, the deformation transformation unit (generation unit) 103 sets the sample positions (sampling point group) 310 with fixed intervals in a predetermined range (for example, a whole part or a part) on the first image 301. The deformation transformation unit 103 then calculates a displacement vector expressed by the first deformation expression at each of the sample positions 310 on the first image 301. Such processing is equivalent to processing in which the deformation transformation unit (generation unit) 103 transforms the coordinates of each of the sample positions 310 on the first image 301 on the basis of the first deformation expression to thereby calculate coordinates of each of the sample positions 311 on the first deformed image 303 as illustrated in FIG. 3D. Here, the sample position 311 in the first deformed image 303 is referred to as a first coordinate transformation sample position.

As a result of the foregoing stage processing described above, the first deformation expression is transformed into deformation expression (intermediate data) that does not depend on a deformation model as a displacement of the plurality of sample positions (sampling point group) 310.

In the following stage processing, the deformation transformation unit 103 expresses the deformation expression (intermediate data) not depending on a deformation model, which is obtained through the foregoing stage processing, again by the second deformation expression using the second deformation model. That is, in the following stage processing, the deformation transformation unit 103 calculates the second deformation parameter of the second deformation model so that the displacement of each of the sample positions 310 obtained in the foregoing stage processing is expressed as accurate as possible.

For example, the deformation transformation unit 103 obtains a difference (a norm of a difference between vectors) between the displacement (displacement vector) of each of the sample positions 310 obtained through the foregoing stage processing and the displacement (displacement vector) of each of the same sample positions 310 by the second deformation expression and calculates the second deformation parameter by which a sum of differences (referred to as a re-expression difference) is minimum.

Since the second deformation model of the present embodiment is the FFD as described above, a well-known method of obtaining a parameter of the FDD on the basis of corresponding point groups (the sample positions 310 and the first coordinate transformation sample positions 311) between images (the first image 301 and the first deformed image 303) is able to be applied.

Specific processing is as follows. The sample positions (sampling point group) 310 of the first image 301 are represented by $X^s=\{x^s1, x^s2, \ldots, x^sN\}$. The first coordinate transformation sample positions 311 of the first deformed image 303 are represented by $X^t=\{x^t1, x^t2, \ldots, x^tN\}$. The number of the sample positions 310 is denoted by "N" and is the same as the number of the first coordinate transformation sample positions 311. The n-th sample position 310 and the n-th first coordinate transformation sample position 311 which are associated with each other are respectively denoted by "$x^s n$" and "$x^t n$". That is, the first coordinate transformation sample position "$x^t n$" is obtained by performing coordinate transformation of the sample position "$x^s n$" with the first deformation model.

In this case, a cost function (re-expression difference) used for following stage processing in which an expression format is transformed is represented by a formula (1).

$$C(T_2(X^s, \theta), X^t) = \frac{1}{N} \times \sum_{n=1}^{N} \|T_2(x_n^s, \theta) - x_n^t\| \tag{1}$$

"$T2 (x^s n, \theta)$" represents coordinates (after coordinate transformation) obtained by displacing the sample position "$x^s n$" by using the second deformation model whose parameter (second deformation parameter) is "$\theta$". That is, it represents the sample position in the second deformed image that is to be obtained when the first image is deformed by using the second deformation expression. Here, the sample position in the second deformed image is referred to as a second coordinate transformation sample position.

A value (value of the second deformation parameter) of "θ" of the formula (1) is calculated by optimizing the parameter "θ" of the second deformation model in accordance with a condition that the first coordinate transformation sample position and the second coordinate transformation sample position which are associated with each other are matched (a total sum of distances is minimized). For the optimization, for example, a well-known method such as a steepest descent method using repetitive optimization is able to be applied. Note that, in addition to the method based on the repetitive optimization, the value of "θ" may be calculated with linear calculation by defining a simultaneous equation whose constraints are point-to-point distances of each corresponding point (coordinate transformation sample positions). Note that, "θ" may be calculated similarly also by setting a displacement vector of the n-th sample position obtained through the foregoing stage processing as "$x^r n$", defining a displacement vector of the n-th sample position "$x^s n$" by the second deformation expression as "T2 ($x^s n$, θ)", and minimizing the re-expression difference of the formula (1).

(Second Registration Processing: Step S2030)

At step S2030, the second registration unit (second deformation acquisition unit) 104 performs second registration (deformation estimation) of the first image and the second image with use of the second deformation model by using the second deformation parameter, which is transformed at step S2020, as an initial value, and thereby updates the second deformation parameter.

The second registration unit (second deformation acquisition unit) 104 stores a value of the second deformation parameter, which is calculated (updated) as a result of the second registration processing, in a storage unit (not illustrated) and outputs the value to the deformed image generation unit 110.

In the second registration processing at step S2030, in addition to a data term related to matching of corresponding point groups (reference point groups) as used in the first registration processing, a normalized term is introduced in a cost function. Note that, as the corresponding point groups, the corresponding point groups acquired by the first registration unit (first deformation acquisition unit) 102 at step S2010 are able to be used.

The normalized term used in the present embodiment is Jacobian related to a deformation. The Jacobian is a determinant of a matrix (Jacobian matrix) calculated by arranging directional derivatives about axes of a displacement vector and the Jacobian at a predetermined coordinate position represents a volume change in a local region around the coordinate position. A method of adding the Jacobian to the cost function of registration as the normalized term for suppressing a volume change is widely known, so that detailed description thereof will be omitted. For example, a control point of the FFD or a Jacobi sum on another grid with predetermined intervals is able to be added as the normalized term to the cost function. The second deformation expression obtained by the second registration expresses not the deformation as a result (the first deformed image) of the first registration but the deformation from the first image. Thus, even when an inappropriate volume change is caused by the first registration processing, the change is expected to be suppressed by the second registration processing.

(Processing of Generating Registered Image: Step S2040)

At step S2040, on the basis of the second deformation parameter updated at step S2030, the deformed image generation unit 110 generates a registered image (deformed image) obtained by deforming at least any one of the first image and the second image so as to match a shape of the other image. The generation of a deformed image based on deformation expression is well known, so that detailed description thereof will be omitted. The deformed image generation unit 110 stores data related to the generated registered image (deformed image) in a storage unit (not illustrated) and outputs the data to the display control unit 111.

(Processing of Displaying Registered Image: Step S2050)

At step S2050, the display control unit 111 performs control to display, on the display unit 170, any image of the first image, the second image, and the registered image (deformed image) in accordance with a user operation. Note that, when the display control unit 111 receives "end of image check" from the user after displaying the registered image (deformed image), the processing of the image processing apparatus 100 ends.

According to the present embodiment, by transforming deformation expression through versatile deformation expression (intermediate data) that does not depend on a deformation model, the deformation by the first deformation model is expressed with the second deformation model to perform registration, so that it is possible to perform registration of images by combining a plurality of any deformation models. Thereby, since a result of the first registration processing, by which an analytic solution is able to be derived, is able to be used as an initial value of the second registration processing by nonlinear optimization, it is possible to perform calculation at higher speed (with the smaller number of times of iteration) compared to a case where the registration is performed only by the second registration processing and to avoid convergence to an erroneous local solution. Further, an initial value closer to an actual deformation is able to be provided by appropriately selecting the first deformation model compared to a case where a deformation by which corresponding point groups are matched with use of the second deformation model is analytically obtained and the deformation is used as an initial value of the second registration processing. For example, by using the TPS as the first deformation model, it is possible to provide a deformation that minimizes a bending energy among deformations by which corresponding point groups are matched. Thus, compared to a case where the analytic solution of the FFD based on corresponding point groups is used as the initial value, it is possible to perform calculation at higher speed (with the smaller number of times of iteration) and to avoid convergence to an erroneous local solution. Since the registration is performed by introducing the normalized term, even when an inappropriate deformation state is caused in the first registration processing, the inappropriate deformation state is able to be corrected in the second registration processing.

Though the first embodiment has been described above, the disclosure is not limited thereto and can be changed or modified within the scope defined in the claims.

In the first embodiment, the processing of transforming the expression format at step S2020 is divided into the foregoing stage processing in which the first deformation expression by the first deformation model is transformed into a displacement of a plurality of sample positions and the following stage processing in which the second deformation parameter of the second deformation model is acquired on the basis of the displacement. However, with a method using the deformation expression (intermediate data) that does not depend on a deformation model, all of the first deformation expression is not necessarily transformed once into an expression format as the displacement of the sample position and the first deformation expression may be transformed in a stepwise manner. For example, a cost function of a formula (2) may be used instead of the cost function of the formula (1).

$$C(T_2(X^s, \theta), T_1(X^s, \alpha)) = \frac{1}{N} \times \sum_{n=1}^{N} \|T_2(x_n^s, \theta) - T_1(x_n^s, \alpha)\| \qquad (2)$$

With the cost function of the formula (2), the coordinate transformation (calculation of a coordinate transformation sample position) of the n-th sample position (sampling point) by the first deformation model may be performed each time cost calculation of the n-th sample position is performed. In the formula, a parameter (first deformation parameter) of the first deformation model is denoted by "$\alpha$". "$T1(x^s n, \alpha)$" represents a coordinate transformation sample position obtained by performing coordinate transformation for the sample position "$x^s n$" with use of the first deformation model whose parameter is "$\alpha$". That is, the coordinate transformation sample position "$T1(x^s n, \alpha)$" is obtained when the sample position "$x^s n$" is subjected to coordinate transformation by the first deformation model. Note that, a displacement vector of the n-th sample position by the first deformation model may be "$T1(x^s n, \alpha)$" and a displacement vector of the n-th sample position by the second deformation model may be "$T2(x^s n, \alpha)$" in the formula (2).

The formula (2) represents a difference (a positional deviation between the sample position and the coordinate transformation sample position) between deformations by the first deformation expression and the second deformation expression. By minimizing the cost function of the formula (2), "$\theta$" is calculated. Note that, the coordinate transformation of the sample position (sampling point) is not limited to the formula (2) and the sample positions like "$T2(x^s n, \theta)$" and "$T1(x^s n, \alpha)$" and the coordinate transformation sample positions do not need to be explicitly calculated.

In the first embodiment, the TPS is used for the first deformation model and the FFD is used for the second deformation model. However, the first deformation model and the second deformation model are not limited to such deformation models and may be other deformation models. For example, a radial basis function (for example, such as Gaussian function or Wendland function) other than the TPS may be used as the first deformation model.

In addition, affine transformation may be used as the first deformation model. In this case, as the processing of the first registration unit 102 at step S2010, a parameter of the affine transformation is calculated, for example, so that similarity (for example, a normalized mutual information amount between images) between the first image (or the image after deforming the first image) and the second image is the highest. Note that, the first deformation model is not limited thereto and may be, for example, a physical simulation model, a deformation model (for example, Statistical Motion Model) based on statistics, or the like.

As the second deformation model, a well-known method of expressing a deformation such as a three-dimensional space is able to be applied as long as being a deformation model (for example, a deformation model by which a distance difference between corresponding point groups is able to be expressed with a cost function) by which a parameter is able to be derived through deformation expression (intermediate data) that does not depend on a deformation model. For example, FFD with multiple resolution may be used as the second deformation model.

In this case, at step S2020, by the FFD with resolution lower than a predetermined threshold, processing of transforming an expression format of the deformation transformation unit 103 is executed. Then, at step S2030, by performing the registration while gradually making the resolution of the FFD fine, the second registration processing of the second registration unit (second deformation acquisition unit) 104 is executed.

As the second deformation model, a deformation model introducing a linear transformation unit such as rigid transformation and a nonlinear transformation unit such as the FFD may be used. When the Jacobian is used as the normalized term, a value of the Jacobian for the rigid transformation is "0". Thus, in a case where the normalized term is introduced in the second registration processing, the normalized term is to be introduced in the nonlinear transformation unit and a calculation amount is able to be reduced. Additionally, a deformation model such as LDDMM (Large Deformation Diffeomorphic Metric Mapping) may be used.

At step S2020, the deformation expression (intermediate data) that does not depend on a deformation model is a displacement vector in a plurality of sample positions (sampling point group) or a combination of a plurality of sample positions (sampling point group) and coordinate transformation sample positions.

A form of the deformation expression (intermediate data) that does not depend on a deformation model is not limited thereto and may be another form. For example, by calculating a displacement vector by coordinate transformation of the first deformation model with respect to each of voxels of the first image, a displacement vector image for associating a value of the displacement vector with the corresponding voxel may be generated and used as the deformation expression (intermediate data) that does not depend on a deformation model. With any expression, it is possible to perform the transformation into the second deformation expression by using the formula (1) or (2).

At step S2020, a form of the deformation expression (intermediate data) that does not depend on a deformation model explicitly expresses a deformation or displacement between the images by the first deformation model. However, the form of the deformation expression (intermediate data) that does not depend on a deformation model may not explicitly express the displacement between the images by the first deformation model.

For example, the deformation transformation unit 103 may generate the first deformed image (image after deformation) obtained by deforming a predetermined image (image before deformation) in the same space as that of the first image on the basis of the first deformation expression, so that a combination of the image before deformation and the image after deformation is set as the deformation expression (intermediate data) that does not depend on a deformation model. In this case, the foregoing stage processing of transforming the expression format (transformation from the first deformation expression into the deformation expression (intermediate data) that does not depend on a deformation model) at step S2020 is processing of generating the image after deformation.

The following stage processing of transforming the expression format (transformation from the deformation expression (intermediate data) that does not depend on a deformation model into the second deformation expression) at step S2020 is realized by performing registration of the image before deformation and the image after deformation by using the second deformation model. A well-known registration method based on similarity between images is able to be applied to the registration processing. Thus, even when the second registration using the second deformation model is suitable for registration processing based on similarity between images, such as an LDDMM method, and is not suitable for registration processing based on corresponding point groups (for example, sample positions), the processing of transforming the first deformation expression into the second deformation expression is able to be suitably performed.

Note that, the first image itself is able to be used for the image before deformation. An image that has an image feature useful for registration processing in the image may be used as the image before deformation. In this case, deformed images (images after deformation) thereof may be generated in the first deformation expression and a combination of the first image and the deformed image may be used as the deformation expression that does not depend on a deformation model. For example, an image obtained by synthesizing an appropriate pattern with the first image, an image having a lattice pattern (having gradation), a random dot image, a vector image having a coordinate value of each axis as a luminance value, or the like is able to be used. Accordingly, the registration processing in the following stage is able to be performed stably.

Second Embodiment

Figure 4:
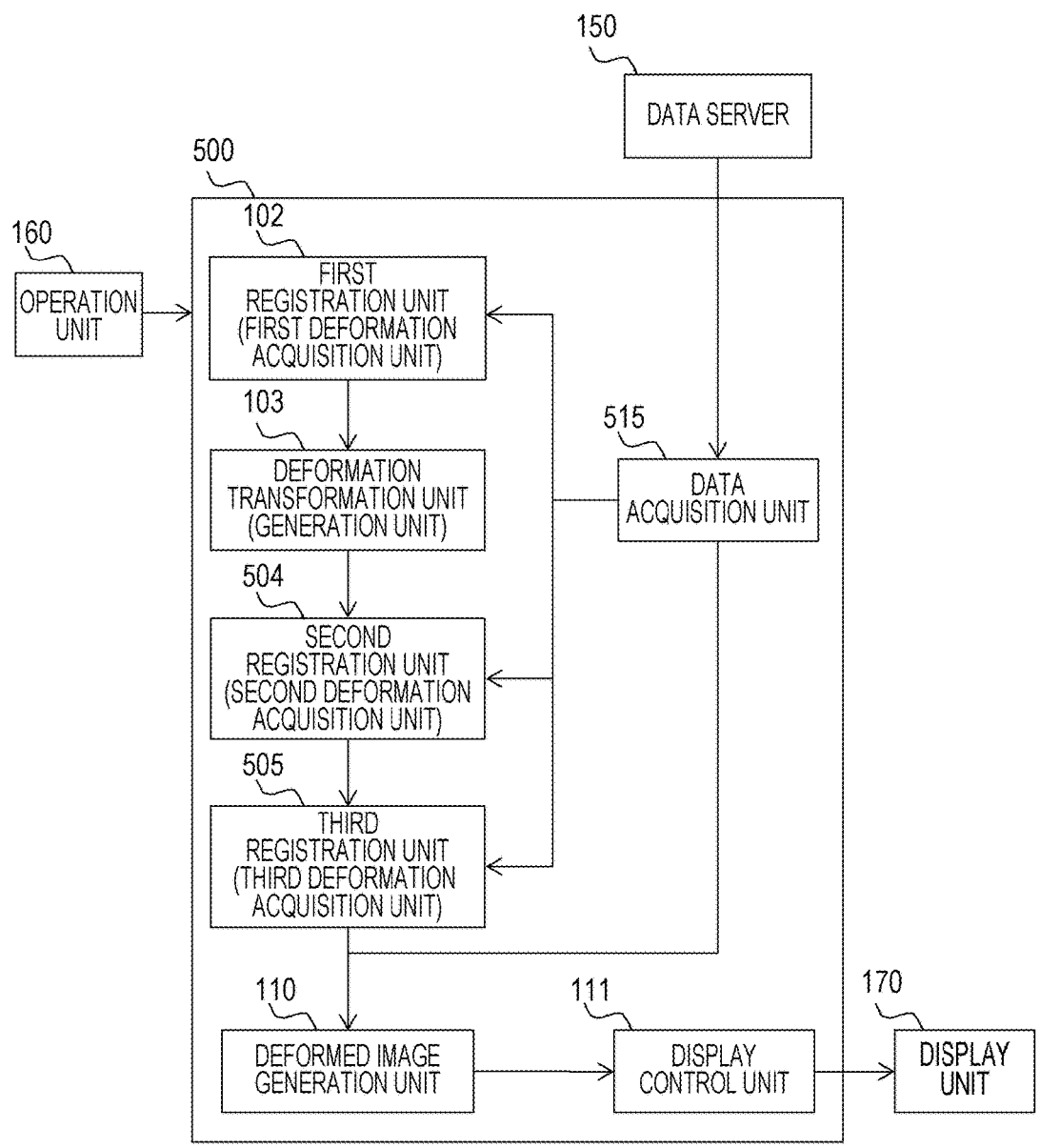
FIG. 4 illustrates an example of an image processing system including an image processing apparatus according to a second embodiment.

An example of an embodiment of the disclosure will be specifically described with reference to drawings. FIG. 4 illustrates an example of an image processing system including an image processing apparatus according to the present embodiment. The image processing system includes an image processing apparatus 500. The image processing apparatus 500 includes a second registration unit (second deformation acquisition unit) 504, a third registration unit (third deformation acquisition unit) 505, and a data acquisition unit 515. Note that, description for configurations, functions, and operations similar to those of the aforementioned embodiment will be omitted and a difference from the present embodiment will be mainly described.

In the first embodiment, the normalized term introduced in the second registration processing at step S2030 is applied to an entire region of the second deformed image. The image processing apparatus 500 according to the present embodiment performs registration processing of setting an image region, to which the normalized term is applied, after second registration processing. The present embodiment has a suitable function, for example, when registration for suppressing a deformation in a predetermined region such as a lesion region is performed after a constraint to prevent occurrence of local distortion is imposed on an entire region of an image (for example, the entire region of the second deformed image).

In the present embodiment, the first deformation model is set as the TPS and the second deformation model is set as the FFD with multiple resolution. Here, description will be given with an example of a case where a normalization condition is applied under which a deformation is suppressed so that local distortion in an entire region of an image is less than a predetermined threshold and a predetermine region (such as a lesion region) is made stiff to be less than the predetermined threshold.

The local distortion by the deformation is calculated by using, for example, a bending energy disclosed in Non Patent Literature 1. Stiffness to the deformation is calculated by using a rigidity penalty disclosed in, for example, Non Patent Literature 3 (A rigidity penalty term for nonrigid registration by M. Staring, S. Klein and J. P. W Pluim, Med. Phys., vol. 34 (11), pp. 4098-4108, 2007).

As a data term of a cost function in registration processing, a value of a distance between corresponding point groups (reference point groups) that are anatomical feature points corresponding to each other between images is used. Similarly to the first embodiment, the first registration unit (first deformation acquisition unit) 102 performs registration of the first image and the second image by using the TPS which is the first deformation model and acquires the first deformation parameter (first registration processing). On the other hand, in the first deformation registration, local distortion due to a deformation or stiffness of a lesion is not appropriately considered.

Thus, in the registration processing by the second deformation model, the registration is performed by using a cost function in which normalized terms related to local distortion due to a deformation and stiffness to a displacement are introduced in addition to the data term related to matching between the corresponding point groups (for example, the reference point groups).

At this time, the normalized term related to suppression of the distortion due to a deformation is applied to an entire image region similarly to the normalized term for suppressing a volume change in the second registration processing (step S2030) of the first embodiment. On the other hand, the normalized term which is used to take the stiffness of a lesion into consideration and related to the stiffness to a deformation is applied to a region designated by masked image data in accordance with the masked image data that designates a predetermined region such as a lesion region.

In the present embodiment, in order to prevent an increase in a processing time associated with calculation of a normalized term and prevent falling into an inappropriate local solution whose solution is greatly different from an appropriate solution, registration processing by the second deformation model is carried out by dividing into a plurality of stages. After the second registration unit (second deformation acquisition unit) 504 performs second registration processing in which the normalized term for an entire image region of the second deformed image is introduced, the third registration unit (third deformation acquisition unit) 505 performs third registration processing in which the normalized term for a predetermined region such as a lesion region is additionally introduced.

The second registration unit (second deformation acquisition unit) 504 performs the registration of the first image and the second image with use of the second deformation model by using the second deformation parameter, which is generated by the deformation transformation unit 103, as an initial value, and thereby updates the second deformation parameter. In this case, the second registration unit (second deformation acquisition unit) 504 uses a cost function in which a bending energy in an entire region of the first image is considered as the normalized term.

Thereafter, the third registration unit (third deformation acquisition unit) 505 performs the registration of the first image and the second image with use of the second deformation model by using the second deformation parameter, which is updated by the second registration unit (second deformation acquisition unit) 504, as an initial value, and thereby further updates the second deformation parameter. In this case, the third registration unit (third deformation acquisition unit) 505 uses a cost function in which a normalized term for suppressing a deformation in a predetermined range on a registered image is further added.

As a result, even when local optimization based on iteration processing is adopted, compared to a case where all normalization is applied from the beginning, a more appropriate registration result is able to be obtained at high speed and stably.

Figure 5:
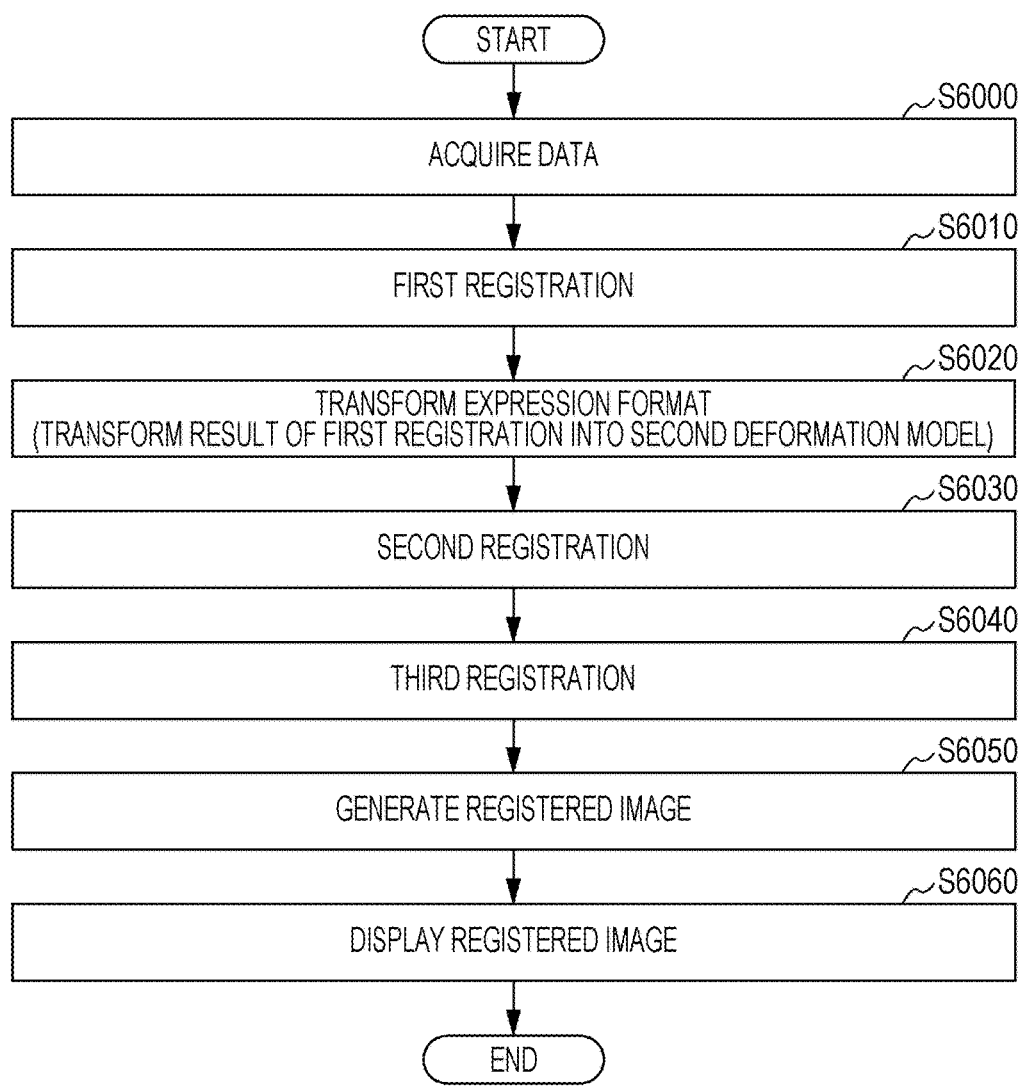
FIG. 5 is a flowchart illustrating processing procedure performed by the image processing apparatus according to the second embodiment.

Next, an operation of the image processing system including the image processing apparatus according to the present embodiment will be described. FIG. 5 is a flowchart illustrating processing procedure performed by the image processing apparatus 500. Note that, in the processing procedure, steps S6010, S6020, and S6060 respectively correspond to the steps S2010, S2020, and S2050 of FIG. 2.

(Data Acquisition Processing: Step S6000)

At step S6000, the data acquisition unit 515 acquires the first image and the second image from the data server 150. The data acquisition unit 515 then outputs the first image and the second image to the first registration unit (first deformation acquisition unit) 102, the second registration unit (second deformation acquisition unit) 504, and the third registration unit (third deformation acquisition unit) 505. The data acquisition unit 515 acquires, from the data server 150, information of masked image data that prescribes a predetermined region (for example, a region, such as a lesion region, in which a specific deformation is considered) in a space of the first image. Further, the data acquisition unit 515 outputs the masked image data to the third registration unit (third deformation acquisition unit) 505.

(Second Registration Processing: Step S6030)

At step S6030, the second registration unit (second deformation acquisition unit) 504 performs the second registration (deformation estimation) of the first image and the second image with use of the second deformation model by using the second deformation parameter, which is transformed at step S6020, as an initial value and thereby updates the second deformation parameter. The second deformation model in the present embodiment is the FFD with multiple resolution. A difference between the processing of step S6030 and the second registration processing (step S2030) in the first embodiment lies in that a bending energy is used instead of Jacobian as a normalized term.

The second deformation parameter calculated (updated) in the second registration processing is output to the third registration unit (third deformation acquisition unit) 505.

(Third Registration Processing: Step S6040)

At step S6040, the third registration unit (third deformation acquisition unit) 505 acquires, from the data acquisition unit 515, the masked image data indicating a region in which a specific deformation is considered. The third registration unit (third deformation acquisition unit) 505 performs the third registration processing, in which a rigidity penalty of a predetermined region is considered, with use of the second deformation model by using the second deformation parameter, which is updated by the second registration unit (second acquisition deformation unit) 504 at step S6030, as an initial value, and thereby further updates the second deformation parameter. Note that, calculation of the FFD in the third registration processing is performed with maximum resolution of the FFD with multiple resolution used for the second registration processing.

In the present embodiment, the third registration unit (third deformation acquisition unit) 505 performs the third registration processing between the first image and the second image with use of the second deformation model by using a result of the registration, which is output from the second registration unit (second deformation acquisition unit) 504, as an initial value, and thereby updates the second deformation parameter. At this time, a cost function in which the normalized term of the rigidity penalty for suppressing a deformation in a predetermined region is additionally introduced in the cost function used for the second registration processing is used as a cost function of the third registration processing.

The third registration unit (third deformation acquisition unit) 505 performs normalization of the rigidity penalty in a predetermined region designated by the masked image data. A value of the second deformation parameter calculated (updated) in the third registration processing is stored in a storage unit (not illustrated) and output to the deformed image generation unit 110.

A difference between the processing of step S6040 and the second registration processing (step S6030) in the present embodiment lies in that normalization is additionally added being limited to the predetermined region designated by the masked image data.

As the normalization, stiffness (rigidity) (rigidity penalty) is adopted. The rigidity penalty is cost represented by a weighted sum of three indexes of Jacobian, orthonormality, and a bending energy. Note that, Non Patent Literature 3 described above, which discloses a method of calculating the rigidity penalty, is used as a reference of deformation registration considering stiffness to a deformation in a predetermined region.

(Processing of Generating Registered Image: Step S6050)

At step S6050, the deformed image generation unit 110 generates a registered image (deformed image) obtained by deforming at least any one of the first image and the second image so as to match a shape of the other image on the basis of the second deformation parameter updated at step S6040. The deformed image generation unit 110 stores data about the generated registered image (deformed image) in a storage unit (not illustrated) and outputs the data to the display control unit 111.

According to the present embodiment, after the first deformation expression calculated by the first deformation model is expressed again with the second deformation model, normalization for an entire region of the first image is applied to converge the second deformation parameter. Then, normalization for a predetermined region of the first image is applied and the second deformation parameter is further updated.

Therefore, an advantage of reducing a risk of falling into a local solution whose solution is inappropriate is created even when local optimization based on iteration processing is adopted. In particular, compared to a case where a predetermined region (for example, a lesion region) is set and normalization for the predetermined region is applied in the second registration processing, a more appropriate registration result is able to be obtained at high speed and stably.

Though the embodiment according to the disclosure has been described above, the disclosure is not limited thereto and can be changed or modified within the scope defined in the claims.

In the present embodiment, at step S6040, the third registration unit (third deformation acquisition unit) 505 performs the third registration processing by applying the rigidity penalty as the normalized term. However, the normalized term applied to a predetermined range may be a normalized term other than the rigidity penalty. For example, the normalized term introduced in the third registration processing may be Jacobian used as the normalized term in the first embodiment. In this case, normalization in which a volume is unchanged is applied to a region designated by masked image data.

At step S6030, the normalized term applied to the entire second deformed image by the second registration unit (second deformation acquisition unit) 504 may be a normalized term other than the bending energy. For example, the normalized term introduced in the second registration processing may be Jacobian normalization related to saving of a volume. At this time, the second registration processing performed by the second registration unit (second deformation acquisition unit) 504 is the same as the second registration processing (step S2030) performed by the second registration unit 104 of the first embodiment.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-080497 filed Apr. 13, 2016, which is hereby incorporated by reference herein in its entirety.

What is claimed is:

1. An image processing apparatus, comprising:
a processor; and
a memory coupled to the processor storing instructions that, when executed by the processor cause the perform operations as:
a first deformation acquisition unit configured to perform registration of a first image and a second image and acquire a first deformation parameter that expresses a deformation between the first image and the second image by using a first deformation model, at least one of the first image and the second image being retained in a storage medium;
a generation unit configured to generate intermediate data that indicates a deformation expressed by the first deformation model and the first deformation parameter; and
a second deformation acquisition unit configured to acquire, based on the intermediate data, a second deformation parameter that expresses a deformation, which is indicated by the intermediate data, by using a second deformation model.

2. The image processing apparatus according to claim 1, wherein
the first deformation acquisition unit acquires the first deformation parameter as first deformation expression, and
the second deformation acquisition unit acquires the second deformation parameter as second deformation expression.

3. The image processing apparatus according to claim 2, wherein
the first deformation acquisition unit performs registration of a first reference point group of the first image and a second reference point group of the second image by using the first deformation model and acquires the first deformation parameter.

4. The image processing apparatus according to claim 2, wherein
the first deformation acquisition unit performs registration based on similarity between the first image and the second image by using the first deformation model and acquires the first deformation parameter.

5. The image processing apparatus according to claim 1, wherein
the first deformation acquisition unit performs registration of a first reference point group of the first image and a second reference point group of the second image by using the first deformation model and acquires the first deformation parameter.

6. The image processing apparatus according to claim 1, wherein
the first deformation acquisition unit performs registration based on similarity between the first image and the second image by using the first deformation model and acquires the first deformation parameter.

7. An image processing apparatus, comprising:
a processor; and
a memory coupled to the processor storing instructions that, when
executed by the processor cause the perform operations as:
a first deformation acquisition unit configured to perform registration of a first image and a second image by using a first deformation model and acquire a first deformation parameter of a first deformed image obtained by deforming the first image, at least one of the first image and the second image being retained in a storage medium;
a generation unit configured to set sample positions on the first image, calculate coordinates of sample positions on the first deformed image corresponding to the sample positions on the first image based on the first deformation parameter, and generate a displacement between the sample positions on the first image and the sample positions on the first deformed image; and a second deformation acquisition unit configured to perform registration of the first image and the first deformed image by using a second deformation model based on the displacement and acquire second deformation parameter of a second deformed image obtained by deforming the first image.

8. The image processing apparatus according to claim 7, wherein the second deformation acquisition unit performs registration of the second deformed image and the second image by using the second deformation model and acquires deformation data of a registered image obtained by deforming the second deformed image.

9. The image processing apparatus according to claim 8, wherein the first deformation acquisition unit performs registration of a first reference point group of the first image and a second reference point group of the second image by using the first deformation model and acquires the first deformation parameter.

10. The image processing apparatus according to claim 8, wherein the first deformation acquisition unit performs registration based on similarity between the first image and the second image by using the first deformation model and acquires the first deformation parameter.

11. The image processing apparatus according to claim 8, wherein the second deformation acquisition unit deforms the first image by using the second deformation model in order to reduce the displacement.

12. The image processing apparatus according to claim 8, wherein the second deformation acquisition unit acquires the deformation data of the registered image by using the second deformation model in which a normalized term for suppressing a deformation of the first deformed image is introduced.

13. The image processing apparatus according to claim 8, further comprising a third deformation acquisition unit configured to set a predetermined range of the registered image, perform registration of the registered image and the second image by using the second deformation model in which a normalized term is introduced for suppressing a deformation of the predetermined range is introduced, and acquire deformation data of a third deformed image obtained by deforming the registered image.

14. The image processing apparatus according to claim 7, wherein the first deformation acquisition unit performs registration of a first reference point group of the first image and a second reference point group of the second image by using the first deformation model and acquires the first deformation parameter.

15. The image processing apparatus according to claim 14, wherein the second deformation acquisition unit deforms the first image by using the second deformation model in order to reduce the displacement.

16. The image processing apparatus according to claim 7, wherein the first deformation acquisition unit performs registration based on similarity between the first image and the second image by using the first deformation model and acquires the first deformation parameter.

17. The image processing apparatus according to claim 7, wherein the second deformation acquisition unit deforms the first image by using the second deformation model in order to reduce the displacement.

18. The image processing apparatus according to claim 7, wherein the generation unit compares the first image and the first deformed image and generates the displacement.

19. An image processing method, comprising:

performing registration of a first image and a second image, at least one of the first image and a second image being retained in a storage medium;

acquiring a first deformation parameter that expresses a deformation between the first image and the second image by using a first deformation model;

generating intermediate data that indicates a deformation expressed by the first deformation model and the first deformation parameter; and acquiring, based on the intermediate data, a second deformation parameter that expresses a deformation, which is indicated by the intermediate data, by using a second deformation model.

20. A non-transitory storage medium storing a program that causes a computer to execute a process comprising:

performing registration of a first image and a second image, at least one of the first image and a second image being retained in a storage medium;

acquiring a first deformation parameter that expresses a deformation between the first image and the second image by using a first deformation model;

generating intermediate data that indicates a deformation expressed by the first deformation model and the first deformation parameter; and acquiring, based on the intermediate data, a second deformation parameter that expresses a deformation, which is indicated by the intermediate data, by using a second deformation model.

* * * * *